Aug. 11, 1931.    W. A. HEINRICH    1,818,620
SLACK PULLER
Filed May 3, 1926    2 Sheets-Sheet 2
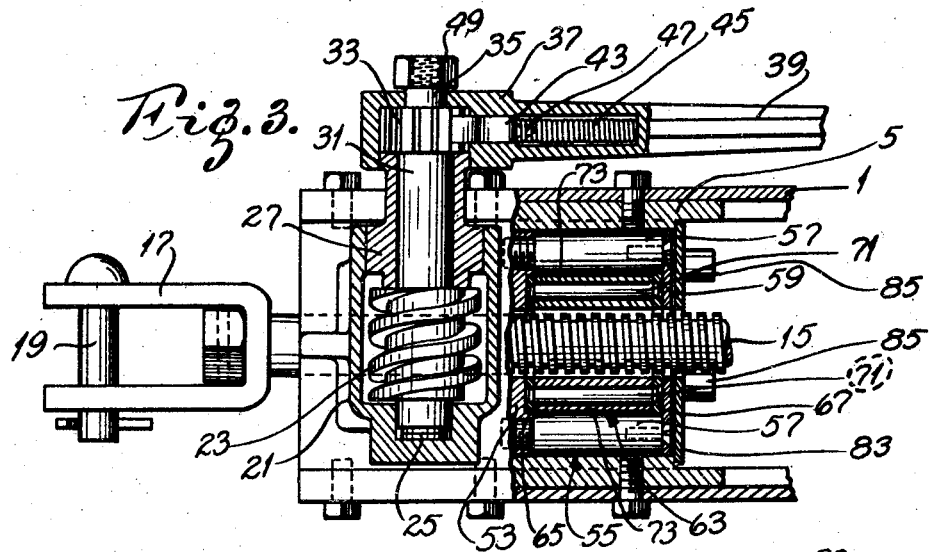
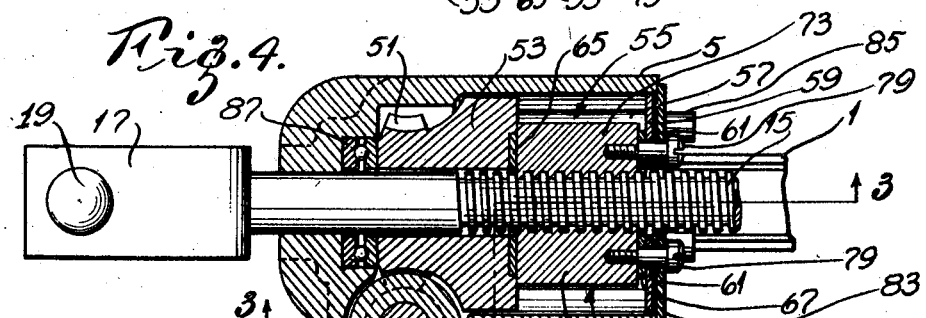
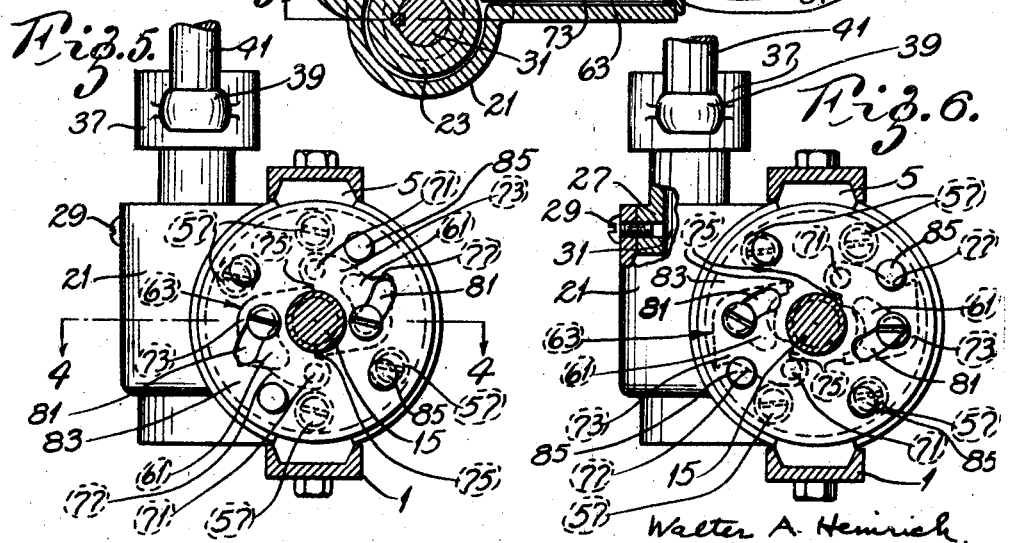
Walter A. Heinrich,
Inventor.
Delos G. Haynes
Attorney Patented Aug. 11, 1931

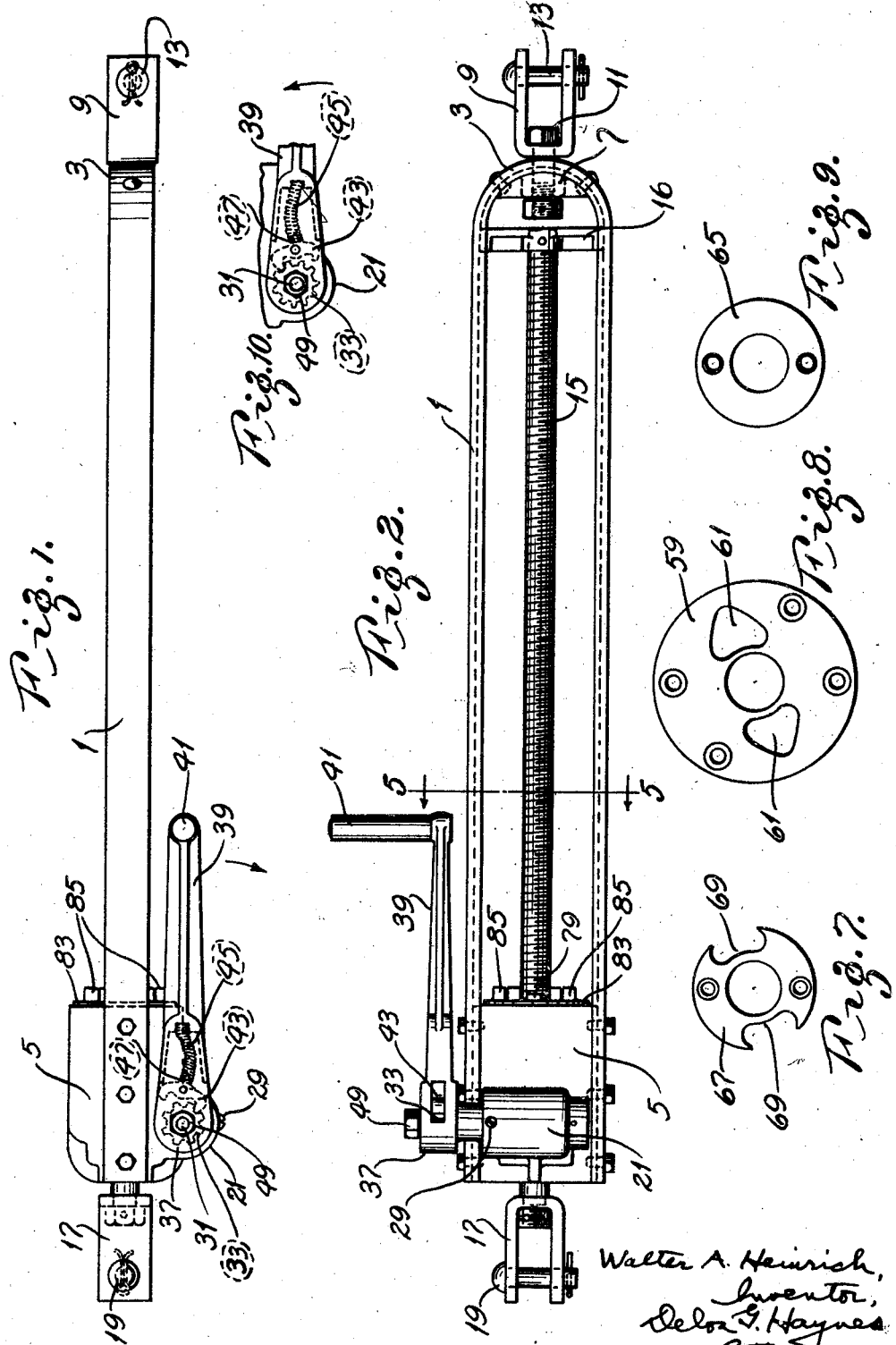

1,818,620

UNITED STATES PATENT OFFICE

WALTER A. HEINRICH, OF ST. LOUIS, MISSOURI, ASSIGNOR TO W. N. MATTHEWS CORPORATION, OF ST. LOUIS, MISSOURI, A CORPORATION OF MISSOURI

SLACK PULLER

Application filed May 3, 1926. Serial No. 106,286.

This invention relates to slack pullers, and with regard to certain more specific features to a slack puller for wire, cable and similar strands.

Among the several objects of the invention may be noted the provision of an improved slack puller which is adapted to take up excessive loose slack quickly, and which is adapted to take up with great force residue slack which remains after excessive slack has been taken up; and the provision of a device of the class described which is light in weight yet exceedingly durable and simple in operation. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings in which is illustrated one of various possible embodiments of the invention, Fig. 1 is a left side elevation of the slack puller;

Fig. 2 is a front elevation thereof;

Fig. 3 is a longitudinal section taken on line 3—3 of Fig. 4;

Fig. 4 is a longitudinal section taken on line 4—4 of Fig. 5;

Fig. 5 is an enlarged lateral section taken on line 5—5 of Fig. 2 and shows a split nut in closed position;

Fig. 6 is a view similar to Fig. 5 and shows the split nut in open position;

Fig. 7 is a plan view of an end-plate for a split nut assembly;

Fig. 8 is a plan view of an end-plate for a worm wheel housing;

Fig. 9 is a plan view of another end-plate for said split nut assembly; and

Fig. 10 is a detailed view of a ratcheting device shown alternately to the position thereof shown in Fig. 1.

Similar reference characters indicate corresponding parts throughout the several views of the drawings.

Referring now more particularly to Fig. 1, there is illustrated at numeral 1 a channel iron or like frame bent to an arc of one hundred and eighty degrees at a section 3 thereof. The section 3 is located substantially midway between the two ends of the channel 1. The two ends of said channel 1 are bolted to a casting 5. The midsection 3 of the channel 1 has a boss 7 riveted thereto for the purpose of carrying a swiveled clevis 9. The clevis 9 is held by means of a conventional nut-and-bolt combination 11 and carries a coupling pin 13 for purposes of fastening it to cable ends and the like.

Longitudinally located with respect to the channel 1 is provided a take-up or draw screw 15 having a square or like type of thread cut thereon. Any type of thread of proper strength may be used. The screw 15 passes through the casting 5 and the parts associated therewith (to be described) and emerges at the lower end of the device. It is provided at its outside or lower end with a preferably non-swiveling clevis 17, which carries a coupling pin 19 for the purpose of fastening to another end of the cable to be stretched. The other end of the screw 15 has a cross-head 16 pinned thereto which slidably engages the grooves of the sides of the channeled frame 1. The screw 15 can not rotate but it may move longitudinally.

The casting 5 carries a reducing gear and a split nut driven thereby, adapted to engage and disengage the said screw 15.

Referring now more particularly to Figs. 3 and 4, there is shown a sidewardly extending portion 21 of the casting 5, formed integrally therewith. The portion 21 is bored out to receive a worm gear 23 and a thrust-bearing 25 therefor. The said bore of the portion 21 is also adapted to receive a cap 27 which, after the worm gear 23 is positioned within the portion 21, is held in place by means of a locking screw 29 (see Fig. 6). The gear 23 is keyed or otherwise fastened to a shaft 31. This shaft 31 passes outwardly from the bearing cap 27 and is there provided with a ratchet wheel 33 fastened tightly thereto. Rotatably borne on a stub end 35 of the shaft 31, and on the end of the cap 27, is a ratchet housing 37 of a crank arm 39. The crank arm 39 is provided with a conventional hand grip 41 (Figs. 1 and 2). Within the housing 37 is pivoted a pawl 43. The pawl 43 is provided with two lugs either one of which may engage the teeth of the ratchet 33. A spring 45 reacts from a point in the housing 37 opposite of the pivot of the pawl, against said pawl at a point near and above the pivot. This point near and above the pivot is provided with a lug 47 adapted to hold the spring 45 in position on the pawl. It is evident from Figs. 1 and 10 that if the spring 45 be initially in a state of compression, the pawl 43 will tend to be over-centered either one way or the other, depending upon the initial lateral curvature manually given to the spring 45. This initial curvature is given to the spring by setting the pawl in either of the driving positions desired, and for this purpose can be reached through openings in the housing 37. It may be noted that in Fig. 1 the driving position of the pawl 43 and ratchet 33 is clockwise while in Fig. 10 it is counter-clockwise (see the arrows in Figs. 1 and 10). By the above described means the worm gear 23 may be rotated in either direction, and as will be seen later its rotation for driving under a stretching load is such that the thrust bearing 25 receives the end thrust. When the device is slacked off from its work the thrust is in the opposite direction but no refined bearing is required because of the light load under such conditions. A nut 49 prevents the crank 39 from being inadvertently endwardly removed.

The gear 23 meshes with a worm wheel 51 cut or otherwise formed integrally with a base 53 of a housing 55 adapted to rotate with said worm wheel 51. The housing 55 comprises said base portion 53, four spacing and driving stems 57 screwed and seated to a shoulder in said portion 53, and an end-plate 59 screwed to the top of said spacing stems 57. It is evident that the worm wheel 51, the base 53, the spacing stems 57 and the end-plate 59 may rotate as a unit when driven from the worm gear 23. The direction of rotation depends upon the direction of rotation of the crank 39. The end-plate 59 is provided with a pair of openings 61 (Figs. 6 and 8) for purposes hereinafter to be described.

The housing 55 retains a floating split-nut assembly 63. This assembly 63 comprises an end plate 65 rotatably positioned in a recess of said base 53 (Figs. 3, 4 and 9). Just below the said plate 59 of the assembly 55 is provided another end-plate 67 of said split nut assembly. The plate 67 is provided with recesses 69 for purposes hereinafter to be described (Fig. 7).

A pair of shouldered pivot members 71 are pivoted between the plates 65 and 67. These members 71 are the pivots upon which a pair of the split nut jaws 73 are adapted to oscillate. The jaws 73 have an open position which is illustrated in Fig. 6 and a closed position which is illustrated in Fig. 5. They are internally threaded to fit the screw 15 when in their closed positions. They also cooperate at portions 75 when in said closed position, whereby a predetermined spacing is provided between the semicircular halves of the threaded portions of the split nut jaws.

The outer portions of the jaws 73 are each provided with a camming portion 77 each of which is adapted to be engaged by one of said spacing stems 57 under driving conditions from the crank 39, that is, when the housing 55 is rotated clockwise (Figs. 5 and 6).

The jaws 73 are manually actuated to open and close by means of a pair of studs 79 one each of which is screwed into the upper end of a jaw 73 respectively. These studs 79 pass through the openings 69 of said end-plate 67, through said openings 61 in said end-plate 59, and through cam slots 81 located in a camming disc 83 mounted rotatably above said end-plate 59 of the housing 55. The disc 83 actually bears rotatably on projections of the casting 5 and is held in position by means of heads on the shouldered studs 79. This disc 83 is also provided with a plurality of extensions 85 which serve to provide means for manually turning the disc one way or the other.

It is evident from Figs. 5 and 6 that the slots 81 are arranged to cam the jaws 73 shut when rotated counter-clockwise (Fig. 5), and to cam them open when rotated clockwise (Fig. 6). After the jaws are cammed shut, they may be rotated to feed the screw 15 into the casting 5. The driving action is positive because the driving and spacing stems 57 engage the portions 77 of the jaws 73. This results in the split nut assembly being both driven and held shut. The more or less triangular openings in the plate 59 permit of the requisite relative movement between the assembly 55 and the assembly 63 (including studs 79) needed before engagement takes place between the stems 57 and the jaws 73 (see Figs. 5 and 6). They also provide for the more or less radial movement of said studs 79.

A thrust bearing 87 is provided for taking the end thrust exerted on the base 53. The curvature of the worm wheel teeth with the worm threads is enough to prevent the speed reducing, and nut assembly from slipping in the opposite direction. There is never a heavy compression thrust encountered by the device, insofar as it is only adapted for tensile applications of the screw 15. The device comprises a tension member in any mechanical system to which it is applied.

In order to open the jaws 73 after a cable or the like has been drawn up, it is only necessary to reverse the pawl 43, back off the crank 39 slightly in order to free the jaws of the stems 57, and turn the plate 83 clockwise (Figs. 5 and 6). The next cable to be tautened may then have its ends applied to the clevises. The very loose slack may then be taken up, or the device adjusted to a new gap merely by pushing the screw 15 through the open split nut. After this is done the nut is closed from the plate 83, the ratchet properly set, and the crank turned in the proper direction to drive the closed nut and to positively hold said nut closed. The quick take-up feature may be used, either to adjust the distance between the clevises to a given gap between wire or cable ends, to quickly take up loose slack, or both.

The device may be unslacked by operation from the crank 39 by reversing the ratchet and the direction of cranking. This action drives the stems 57 against the jaws 73 from the opposite sides, thereby holding the jaws shut and unscrewing them.

The purpose of the openings 69 in the plate 67 is to permit inward movement of the screws 79 as the jaws 73 therewith are closed. The overall size of the nut assembly is thus decreased. The particular shape of said openings 69 need only be such as to accommodate the screws 79. The particular shape shown in the drawings has been adopted in practice because the same die which makes the openings 61 in the disc 59 can be made to cut these openings 69.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A slack puller comprising a frame, a housing joined thereto, a screw passing longitudinally and slidably therethrough, means for preventing rotation of the screw, a split nut associated with the housing adapted to fit said screw when closed, to feed the same into and out of said frame upon rotation of the nut, means for opening and closing said nut and means for driving the same, said driving means tending to hold the nut shut with a force which increases as the force exerted by the slack puller increases.

2. A slack puller comprising a frame, a screw mounted in respect to said frame for longitudinal movement without rotation, a split nut mounted rotatably with respect to said frame and adapted to fit said screw when closed and releasing said screw for longitudinal movement when opened and means for driving said split nut when the nut is closed on the screw, said means tending to hold the split nut closed, the force of which increases as the load pulled by the slack puller increases.

3. A slack puller comprising a frame, a housing joined thereto, a screw passing longitudinally and slidably through the housing, means for preventing rotation of the screw, a split nut mounted within the housing having swingable jaws for engaging said screw, manual means for opening and closing said jaws in respect to the screw and means for holding the same shut with a force which is a function of the driving force of the slack puller.

4. In a slack puller comprising a longitudinally movable but non-rotatable screw, a split nut comprising jaws pivoted to a floating member, said jaws being engageable with said screw, a rotatable housing surrounding said floating member and adapted to be driven to rotate, manual operable means for moving said jaws to open and closed positions and means associated with said rotatable housing for engaging said jaws, the engagement being such as to effect rotation of the floating member and jaws and to tend to hold said jaws shut.

5. In a slack puller comprising a longitudinally movable but non-rotatable screw, a split nut comprising jaws pivoted to a floating member, said jaws being engageable with said screw, a rotatable housing surrounding said floating member and adapted to be driven to rotate, manual operable means for moving said jaws to open and closed positions and means associated with said rotatable housing for engaging said jaws, the engagement being such as to effect rotation of the floating member and jaws and to tend to hold said jaws shut, and anvils associated with the jaws for limiting their movement upon closure, whereby a predetermined spacing is provided between the jaws and said screw.

6. In a slack puller comprising a longitudinally movable but non-rotatable screw, a split nut comprising pivot members, jaws separately pivoted to said members, said jaws being in engagement with said screw, a rotatable housing surrounding said jaws and adapted to be driven to rotate, means associated with said rotatable housing for engaging said jaws, the engagement being such as to effect rotation of the jaws and to tend to hold said jaws shut.

7. In a slack puller comprising a longitudinally movable but non-rotatable screw, a split nut comprising pivot members, jaws separately pivoted to said members, said jaws being engageable with said screw, a rotatable housing surrounding said jaws and adapted to be driven to rotate, means associated with said rotatable housing for engaging said jaws, camming means on the jaws at the points of engagement, the engagement being such as to effect rotation of the jaws and to tend to hold said jaws shut and means on the jaws adapted to be engaged by the engaging means upon reverse rotation, whereby said rotational and holding tendency on the jaws may be effected in either direction of rotation.

In testimony whereof, I have signed my name to this specification this 30th day of April, 1926.

WALTER A. HEINRICH.